(12) United States Patent
Matthey

(10) Patent No.: US 7,113,451 B1
(45) Date of Patent: Sep. 26, 2006

(54) ELECTRONIC WATCH HAVING A COMPASS FUNCTION

(75) Inventor: Gérald Matthey, Ballaigues (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 11/370,936

(22) Filed: Mar. 9, 2006

(30) Foreign Application Priority Data

Mar. 9, 2005 (EP) .................................. 05005113

(51) Int. Cl.
G04B 47/00 (2006.01)
G04B 47/06 (2006.01)
G01C 17/14 (2006.01)
G01C 1/00 (2006.01)

(52) U.S. Cl. ......................... 368/10; 368/14; 33/349; 33/354; 33/355 R

(58) Field of Classification Search ................ 368/10, 368/11, 14, 20; 33/349, 354, 355 R
See application file for complete search history.

(56) References Cited

U.S. PATENT DOCUMENTS

| | | | |
|---|---|---|---|
| 4,482,255 A * | 11/1984 | Gygax et al. ................ | 368/10 |
| 5,550,794 A | 8/1996 | Born et al. | |
| 5,596,551 A * | 1/1997 | Born et al. ................ | 368/10 |
| 5,697,162 A * | 12/1997 | Bornand et al. ............ | 33/352 |
| 5,721,713 A * | 2/1998 | Bornand ..................... | 368/10 |
| 5,790,477 A * | 8/1998 | Hauke ........................ | 368/10 |
| 5,883,861 A * | 3/1999 | Moser et al. ............... | 368/10 |
| 6,185,157 B1 * | 2/2001 | Farine ........................ | 368/10 |

FOREIGN PATENT DOCUMENTS

| | | |
|---|---|---|
| CH | 690 697 A5 | 12/2000 |
| EP | 0 674 247 A1 | 9/1995 |
| EP | 0 713 162 A1 | 5/1996 |
| EP | 0 871 096 A1 | 10/1998 |

OTHER PUBLICATIONS

European Search Report in corresponding application No. EP 05 00 5113 completed Sep. 30, 2005.

* cited by examiner

*Primary Examiner*—Vit Miska
(74) *Attorney, Agent, or Firm*—Griffin & Szipl, P.C.

(57) ABSTRACT

The multi-function watch (1) includes a magnetic sensor assembly associated with its electronic circuits. The hands (7 to 9) of its display are activated by electric motors to indicate the time in a time mode and directions in a compass mode. In order to indicate simultaneously the direction of north and another pre-selected direction, particularly a heading to be followed, in a clear manner avoiding any risk of confusion between these two directions, the direction of north (N) is shown in real time by the hour (7) and minute (8) hands, aligned opposite each other to form one long hand like that of a conventional compass, whereas the direction (C) corresponding to the heading to be followed is simultaneously shown by the second hand (9), forming the desired angle (A) with the two aligned hands. In compass mode, the heading value is visible on a digital display (13), which has other functions in other modes.

8 Claims, 2 Drawing Sheets

ELECTRONIC WATCH HAVING A COMPASS FUNCTION

This application claims priority from European Patent Application No. 05005113.5, filed Mar. 9, 2005, the entire disclosure of which is incorporated herein by reference.

BACKGROUND OF THE INVENTION

The present invention concerns a watch with a compass function, the watch comprising an electronic assembly including a watch movement and associated with manual control members, and with a magnetic sensor assembly, capable of measuring the direction of the terrestrial magnetic field in relation to the watch, and with display means comprising central hands activated by electric motors to indicate the time on a dial in a time display mode and to indicate the direction of north in a compass mode by means of two of said hands, set and held in mutually aligned opposite positions.

A wristwatch of this type, marketed by Tissot SA under the name T Touch®, is the subject of CH Patent No. 690 697 and includes an analogue display with two hands, in addition to a digital liquid crystal display. The compass includes a magnetic sensor assembly of the type described in EP Patent No. 713 162, having a radially magnetised rotor and two Hall probes arranged in fixed positions. The control members of this multi-function watch include three lateral push-buttons and seven capacitive keys formed by transparent electrodes on the inner face of the watch crystal. In compass mode, the direction of north is continuously indicated by means of the hour and minute hands, aligned opposite each other to form together a single hand long enough to pass over a large part of the dial, thus resembling the magnetised hand of a conventional compass. A notable advantage of this magnetic watch-compass is that it indicates the direction of north in real time, independently of any movements that the user might impart to the watch during use of the compass.

This advantage does not exist in watches or other apparatus which calculate and display a direction from two successive measurements made by a terrestrial satellite positioning system such as GPS, for example as provided in EP Patent No. 871 096. In fact, according to this system, the direction of point selected as the target is indicated in relation to a reference axis of the watch, for example the 6 o'clock–12 o'clock axis of the dial, that the user has to keep in the direction of movement defined by the two preceding measurement points. As this reference system is not fixed in relation to the Earth, any rotational movement of the watch before the measurement of the position of the following point is accompanied by the hand and thus distorts the direction indication.

Moreover, EP Patent No. 713 162 discloses a magnetic compass watch that can indicate, via one of its two hands, a geographical azimuth comprised between 0° and 360°, that the user will have pre-selected beforehand using the manual control means of the watch. It is also provided means for imputing the magnetic declination of the location in order to convert the magnetic azimuths into geographical azimuths. The user can operate his watch such that the hand indicates either north (zero azimuth), or a pre-selected heading, to follow, but not both at the same time.

SUMMARY OF THE INVENTION

The present invention concerns a magnetic compass watch able to indicate simultaneously the direction of north and another pre-selected direction, particularly a heading to be followed, in a clear manner avoiding any risk of confusion between these two directions.

There is therefore provided a watch of the type specified in the preamble hereinbefore, characterized in that the display means comprise a third hand displaying time-related information in the time display mode, in that the watch includes means for selecting a heading in relation to north via action on the manual control means and in that, in the compass mode, the selected heading is indicated by the third hand, set and maintained in an angular position corresponding to the heading in relation to the direction of the two aligned hands. Preferably, the third hand is also a central hand, thinner than the other two, as is generally the case of a second hand.

Preferably, the display means further include a digital display capable of indicating the heading value in the compass mode and another indication in the time display mode.

The features of the invention enable the person wearing the watch to observe the direction of north and the direction of his target simultaneously and continuously, without any risk of confusion between such directions since the indication of north by the two aligned hands through the dial is perfectly identifiable, whereas the heading is indicated by a hand starting from the centre of the dial. Moreover, the heading value indication on the digital display in compass mode enables the user to check whether the heading indicated by the hand is that which he wishes.

Further, the user can advantageously place the watch on a geographical map to orient the map in relation to north and to check on the map that the heading indicated by the third hand actually corresponds to the direction of the place that the user wishes to reach.

BRIEF DESCRIPTION OF THE DRAWINGS

Other features and advantages of the present invention will appear from the following description, which presents an advantageous embodiment by way of non-limiting example with reference to the annexed drawings, in which.

DETAILED DESCRIPTION OF AN EMBODIMENT

Figure 1:
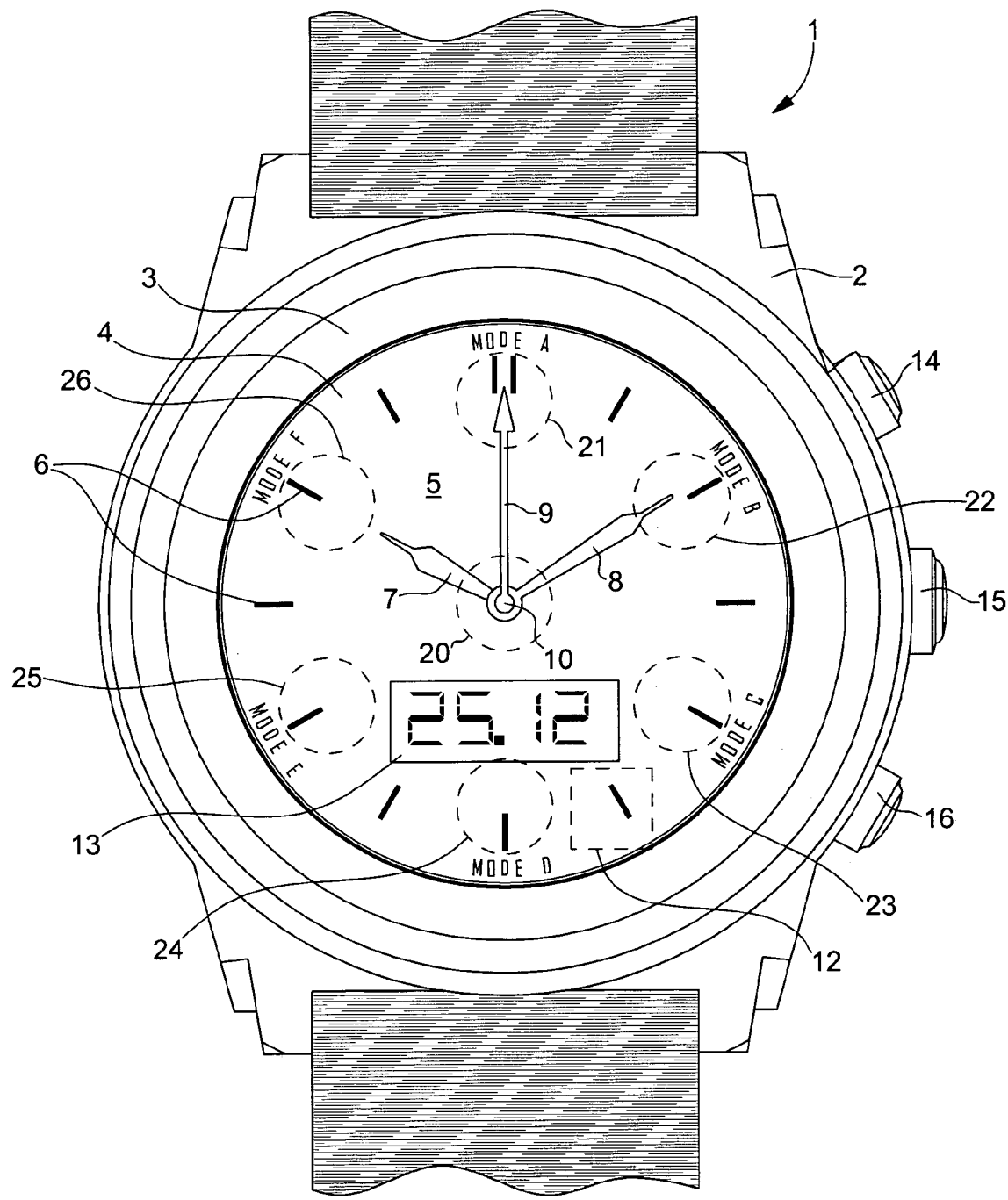
FIG. 1 shows schematically the top face of a multi-function wristwatch according to the invention, in time display mode.
Figure 2:
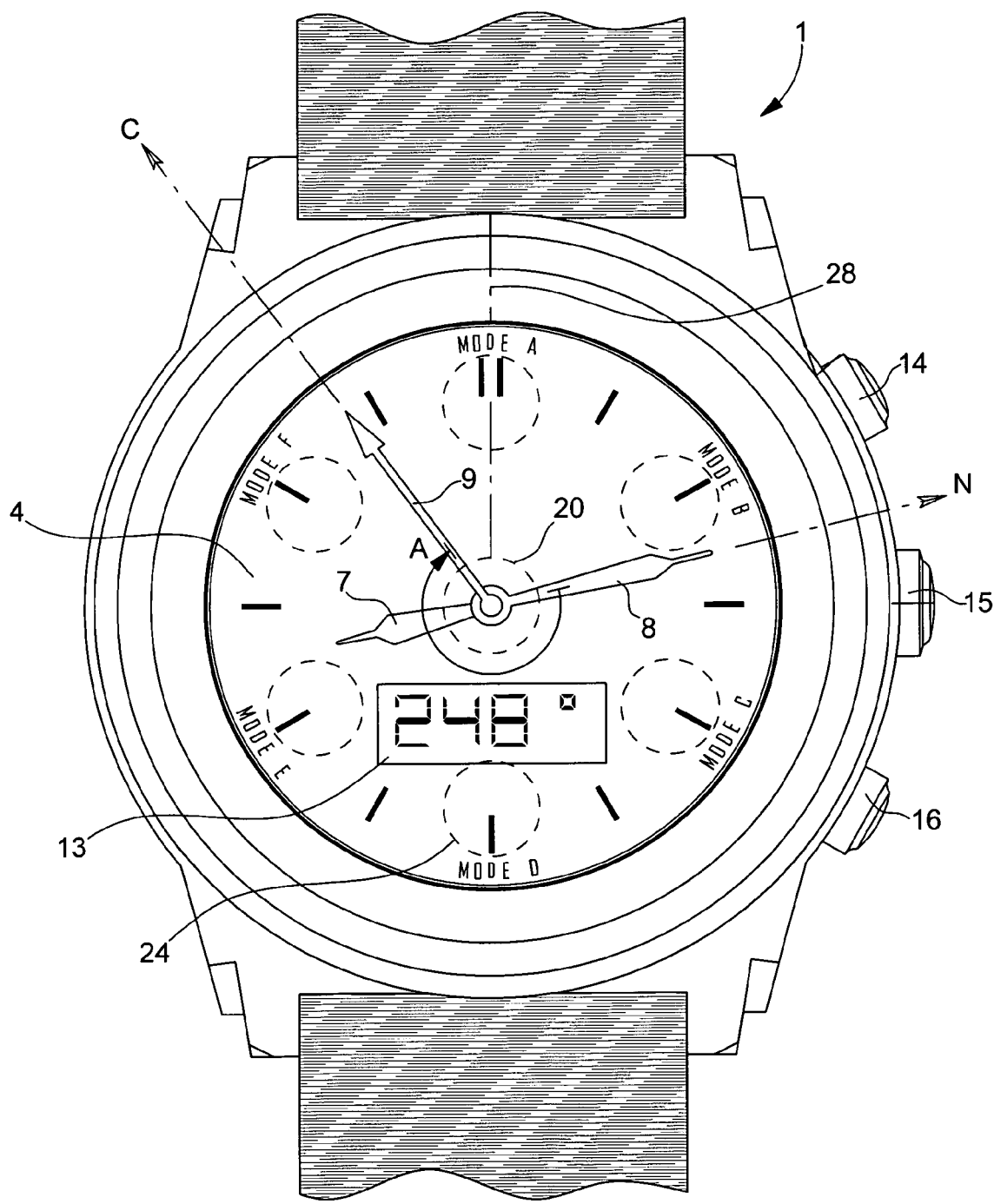
FIG. 2 shows the display of the same watch in compass mode.

The multi-function wristwatch 1 shown in the drawings includes a case comprising, in a conventional manner, a middle part 2 provided with a back cover, a bezel 3 and a crystal 4 located above a dial 5. Twelve hour symbols 6 are affixed to the dial to provide an analogue time display by means of central hands including here an hour hand 7, a minute hand 8 and a second hand 9. These hands rotate about the centre 10 of the dial via the action of electric stepping motors, capable of individually driving each hand in both rotational directions. The watch further includes a digital display 13, for example in the form of a liquid crystal display (LCD) placed in an aperture of dial 5. FIG. 1 shows schematically the magnetic sensor assembly 12, which is housed in the watchcase and which can be of the type described in EP Patent No. 713 162.

In order to select and operate the various functions of watch 1, three push-buttons 14, 15 and 16 with electric contacts are provided, mounted in the middle part 2 of the watch, and seven control keys 20 to 26 arranged opposite dial 5 and acting as mode selection keys. In the present case, as in the aforementioned T touch watch, keys 20 to 26 are capacitive keys formed by transparent electrodes affixed underneath crystal 4 and connected in the watch to an electronic detection circuit by means of a network of transparent conductive paths that go as far as the periphery of the crystal. The reader can find a description of this type of capacitive key control device in EP Patent No. 674 247. Keys 21 to 26 are used to operate six different operating modes A to F of the watch, which are identified by corresponding markings on the dial. Central key 20 controls the time display mode. Some of the modes can include several secondary modes, selected and controlled by different action sequences on the capacitive keys and the push-buttons. The results of the functions thereby operated can be shown by digital display 13 and/or by one or several of hands 7 to 9 of the analogue display. The watch can also provide acoustic signals in certain circumstances.

As can be seen in FIG. 1, in the time display mode, hands 7 to 9 indicate as usual the hour, minute and second, whereas digital display 13 can provide another indication, for example non-time related information such as the date as is the case here, but also time-related information, for example the time in a second time zone.

The compass mode corresponds for example to mode D mentioned in the drawings, that the user switches on by placing his finger on capacitive key 24 after having activated the detection circuit of the capacitive keys by pressing on central push-button 15.

The compass of watch 1 can be designed and operate like the compass of the aforementioned T Touch watch. In particular, the radially magnetised rotor of sensor assembly 12 is permanently oriented parallel to the north-south direction of the terrestrial magnetic field and thus acts as a magnetic field amplifier. When the watch is in compass mode, the two Hall probes arranged perpendicularly to each other supply signals that the associated electronic circuits process to deliver a signal representing the angular orientation of the magnetic axis of the rotor in relation to a fixed reference axis in the watch. Preferably, the electronic circuits apply a correction corresponding to the magnetic declination of the location, previously entered by the user, so that it shows the direction of true north instead of that of magnetic north. The electric motors activating hands 7 and 8 are operated in accordance with this signal so that minute hand 8 forms the same angle as the rotor (subject to any correction) with reference axis 28 and thus points in the direction of north N, and so that hour hand 7 points in the diametrically opposite direction, this operation being repeated several times per second in order to keep the hands in the correct position in relation to the Earth in real time, even if the user moves his watch. As stated previously, the two aligned hands 7 and 8 appear to form one long hand which extends over a large part of the dial and which thus simulates the magnetised hand of a conventional compass.

At the same time, the electronic circuits of the watch operate the motor activating second hand 9 so as to place and hold it in a position in which it forms a constant pre-selected angle A with minute hand 8 indicating north. Consequently, this third hand 9 indicates, in real time, the direction of a heading C that the user has to follow to reach a point that he has chosen, the heading being a geographical azimuth equal to angle A. At the same time, the numerical value of the heading, 248° here, is indicated by the digital display 13. Of course, since angle A is kept constant, the three hands 7, 8 and 9 pivot together as one unit in relation to the case if the latter is pivoted in its plane. The heading indication by hand 9 is clearly distinct from the indication of north because hand 9 starts from the centre of the dial, whereas north is indicated by the aligned hands simulating the hand of a conventional compass. Hand 9 also differs from the other two in that it is narrower. Further, it can carry a particular sign such as the arrow-shaped point shown in the drawings.

The user can pre-select the heading in the following manner. The watch must first of all be set in compass mode, as explained hereinbefore The user increments the heading value by pressing on push-button 14, or decrements it pressing on push-button 16, the current value being indicated by digital display 13. Second hands 9 can be made to remain immobile during these operations, but its position could also be adjusted in real time to the numerical indication, which allows the heading to be selected while the watch is placed on a geographical map, so that the user directly sees on the map which are the points corresponding to the heading. Once the desired heading is displayed, the user validates this value by pressing on push-button 15, the value is stored in the electronic circuits and the watch operates normally in compass mode. Preferably, the watch automatically returns to time mode after a predetermined time in compass mode, in order to limit energy consumption. As regards the rest, watch 1 can operate like the aforementioned T Touch watch.

Those skilled in the art will understand that the compass mode display functions which are described hereinbefore can be obtained with different constituent elements. In particular, instead of the magnetic sensor assembly with a magnetised rotor, a solid state magnetic sensor assembly could be used. Moreover, the control members of the watch can differ from those described here, for example they may include a rotating control stem cooperating with electric switches or magnetic or capacitive sensors.

What is claimed is:

1. A watch having a compass function, the watch including an electronic assembly including a watch movement and associated with manual control members, with a magnetic sensor assembly, capable of measuring the direction of the terrestrial magnetic field in relation to the watch, and with display means including central hands activated by electric motors for indicating the time on a dial in a time display mode and indicating the direction of north in a compass mode by means of a two of said hands, set and maintained in mutually opposite aligned positions, the watch being wherein the display means include a third hand displaying time information in the time display mode, in that the watch includes means for selecting a heading in relation to north via action on manual control means and wherein, in the compass mode, said heading is indicated by the third hand, set and maintained in an angular position corresponding to the heading in relation to the direction of the two aligned hands.

2. The watch according to claim 1, wherein the third hand is a central hand.

3. The watch according to claim 2, wherein the third hand is narrower than the other two.

4. The watch according to claim 1, wherein the display means further includes a digital display capable of indicating the value of the heading in the compass mode and another indication in the time display mode.

5. The watch according to claim 4, wherein in a heading selection mode, the digital display indicates the successive values of the heading in response to actions on the manual control means.

6. The watch according to claim 1, wherein the manual control members include mode selection keys, arranged opposite the watch dial.

7. The watch according to claim 6, wherein the mode selection keys are transparent capacitive keys arranged under a crystal covering the display means.

8. The watch according to claim 6, wherein the manual control members include three push-button contacts respectively having the function, in the compass mode, of incrementing, decrementing and validating the selected heading value.

* * * * *